United States Patent [19]

Van Scoy

[11] 4,399,708
[45] Aug. 23, 1983

[54] ORIFICE METER WITH ROTATABLE ISOLATION SEALING MEMBER

[75] Inventor: Davis A. Van Scoy, Simonton, Tex.

[73] Assignee: Grove Valve and Regulator Company, Oakland, Calif.

[21] Appl. No.: 334,143

[22] Filed: Dec. 24, 1981

[51] Int. Cl.³ .............................................. G01F 1/42
[52] U.S. Cl. ................................. 73/861.61; 138/94.3
[58] Field of Search ............ 73/432 B, 861.61, 861.62; 138/94.3

[56] References Cited

U.S. PATENT DOCUMENTS

| | | | |
|---|---|---|---|
| 2,585,290 | 2/1952 | Walker | 73/861.61 |
| 3,079,796 | 3/1963 | Freudenthal et al. | 73/861.62 |
| 4,151,745 | 5/1979 | Cordy et al. | 73/272 |

Primary Examiner—Herbert Goldstein
Attorney, Agent, or Firm—Melvin R. Stidham

[57] ABSTRACT

An orifice meter having a working housing with flow tubes and an isolation chamber for servicing the orifice. An annular member in the working housing isolated into one position to align an access opening with the isolation chamber to enable movement of a gate-like orifice carrier into and out of the working housing, and into another position wherein it seals off the isolation chamber.

4 Claims, 3 Drawing Figures

ORIFICE METER WITH ROTATABLE ISOLATION SEALING MEMBER

BACKGROUND OF THE INVENTION

Natural gas is generally sold by volumetric measurement, and one way to measure the volume of a flowing gas is to pass it through an orifice of a known size, and measure the pressure drop across it. An orifice meter comprises a housing within which a disc with an orifice is supported in a gas pipeline, the housing being fitted with pressure taps for measuring pressure immediately upstream and downstream of the orifice. Because the orifice is subject to wear by impacting of sand, line scale, and other foreign particles in the flowing stream, it must be replaced at frequent intervals to insure accuracy in measurement.

In the basic, or junior type orifice meter, the pipeline must be shut down or bypassed while the worn orifice disc is removed from the body and replaced with a new disc. In the more sophisticated or senior type orifice fittings, the orifice disc carrier is moved out of the flow passage to a displaced compartment of the housing, which is then isolated from the flow passage so that flow can continue while the orifice disc is being replaced. If gas flow is continued during the time the orifice disc is being replaced, it is customary to assume a continuing, constant flow rate based on previous measurements. However, with changes in pressure and other variations that can take place in pipeline flow, it is highly desirable to minimize the length of the period during which the parties rely on an unmeasured, assumed rate of flow.

OBJECTS OF THE INVENTION

It is an object of this invention to provide an orifice fitting wherein an orifice disc may be removed and replaced in a minimum amount of time.

It is a further object of this invention to provide an orifice fitting wherein the movement of the orifice disc carrier to position the orifice disc for replacement, simultaneously seals off the flow passage to enable continued flow.

It is a further object of this invention to provide an orifice meter wherein the orifice carrier may be moved to carry the orifice disc to a displaced chamber outside of the flow passage and, at the same time, seal off that chamber from gas flow in the pipeline.

Other objects and advantages of this invention will become apparent from the description to follow, particularly when read in conjunction with the accompanying drawings.

SUMMARY OF THE INVENTION

In carrying out this invention, there is formed a valve body with a flow passageway therethrough. A slot or access opening in the top of the body allows movement of a gate-like orifice disc carrier between an active position in alignment with the flow passage and a servicing position exterior of the body. An annular member is rotatable in the body about the axis of the flow passage and in one segment has a receptacle which, when moved into alignment with the access opening, receives the orifice disc carrier. Another segment of the annular member carries a seal member which seals around the access opening when that segment is moved into alignment with it. A third segment of the annular member carries a gear segment which is engaged by a pinion to move the annular member into a selected one of the other two positions.

DESCRIPTION OF A PREFERRED EMBODIMENT

Figure 1:
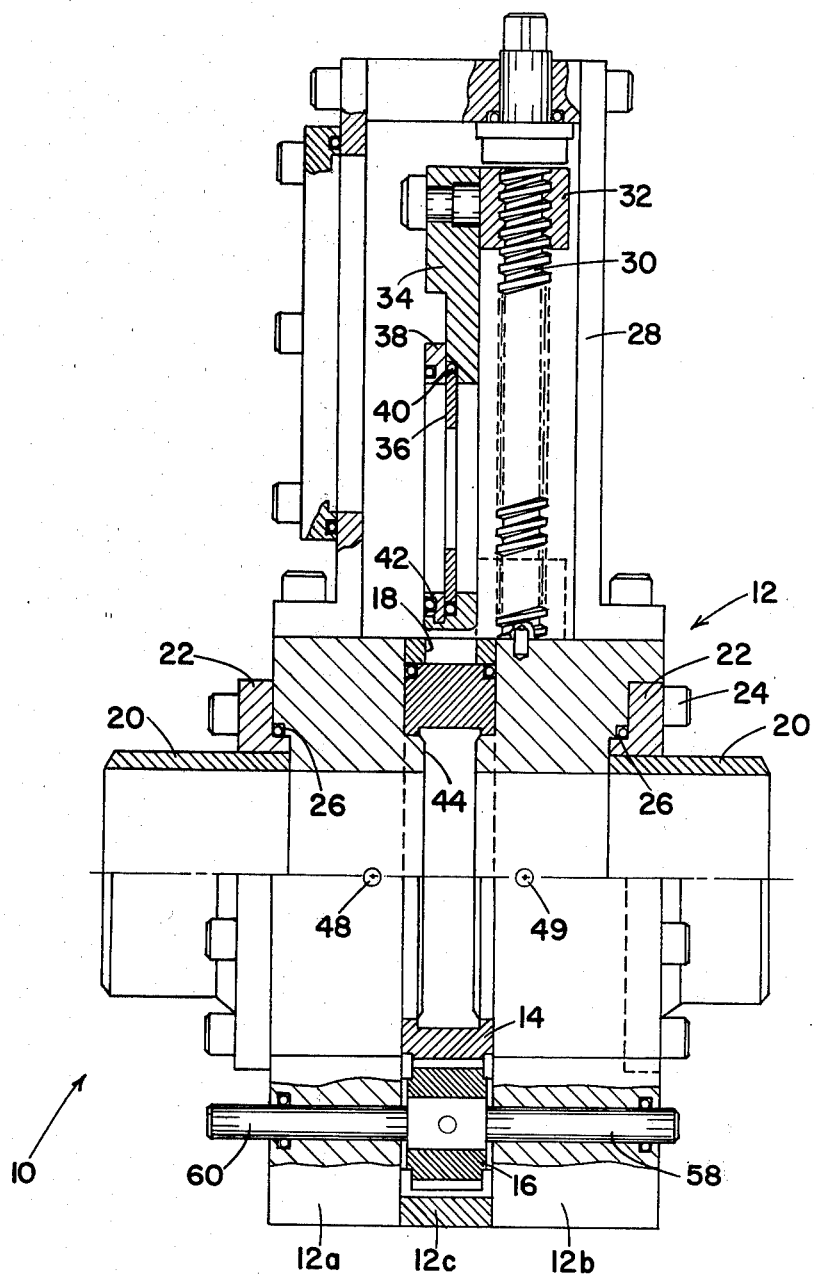
FIG. 1 is a vertical section view of an orifice meter embodying features of this invention.

Referring now to the drawings with greater particularity, the orifice meter 10 of this invention includes a body 12 which is made up of two end blocks 12a and 12b, and a center housing section 12c which is contoured to receive a rotatable member 14 and a driving pinion 16. The central section is also formed with an upper access opening or slot 18 for a purpose to be described. The end blocks 12a and 12b are provided with flow tubes 20 carrying mounting flanges 22 which are secured to the end blocks 12a by means of cap screws or the like at 24 and sealed at 26.

Rotatably mounted between one end block 12b and the top of a yoke or housing 28 is a screw 30 and suspended from a drive nut 32 engaging this screw 30 is an orifice disc carrier in which an orifice disc 36 is secured by a mounting plate 38 and sealed at 40. A seal ring 42 on the mounting plate 38 engages a sealing surface 44 on the inner surface of the end block 12a when the orifice disc carrier is in its lowered or active position.

Figure 2:
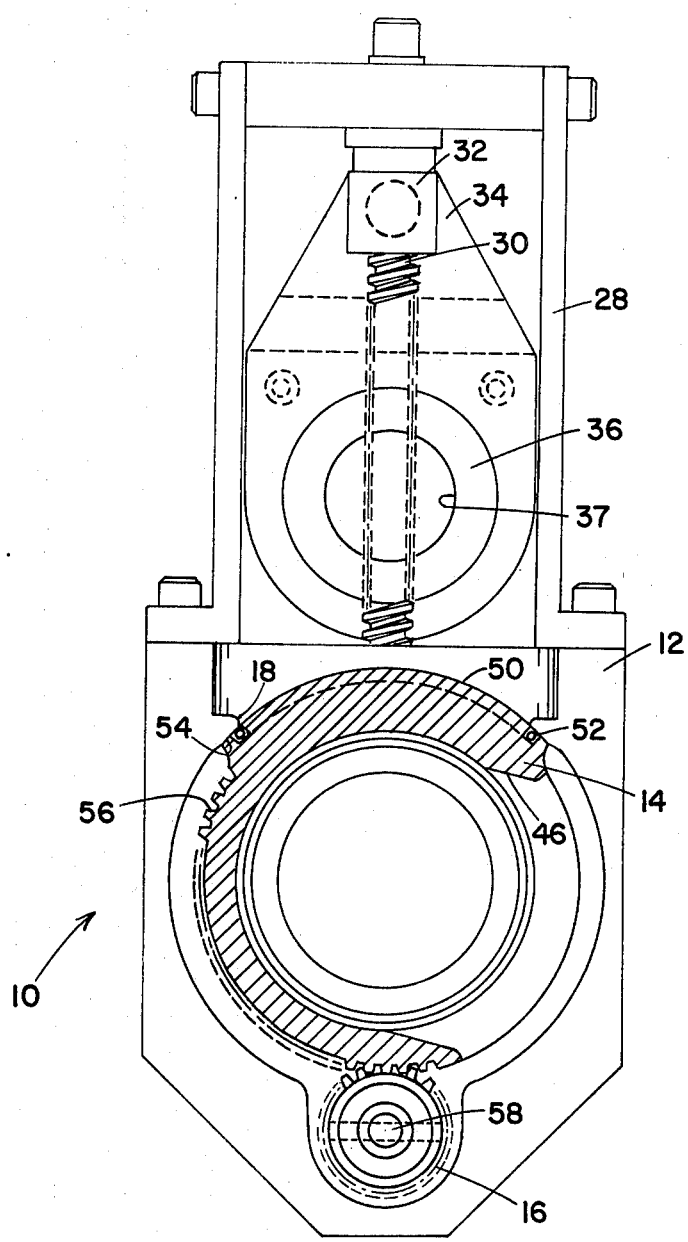
FIG. 2 is a vertical section view of the orifice meter taken perpendicular to the flow passageway and showing one position of the orifice disc carrier.
Figure 3:
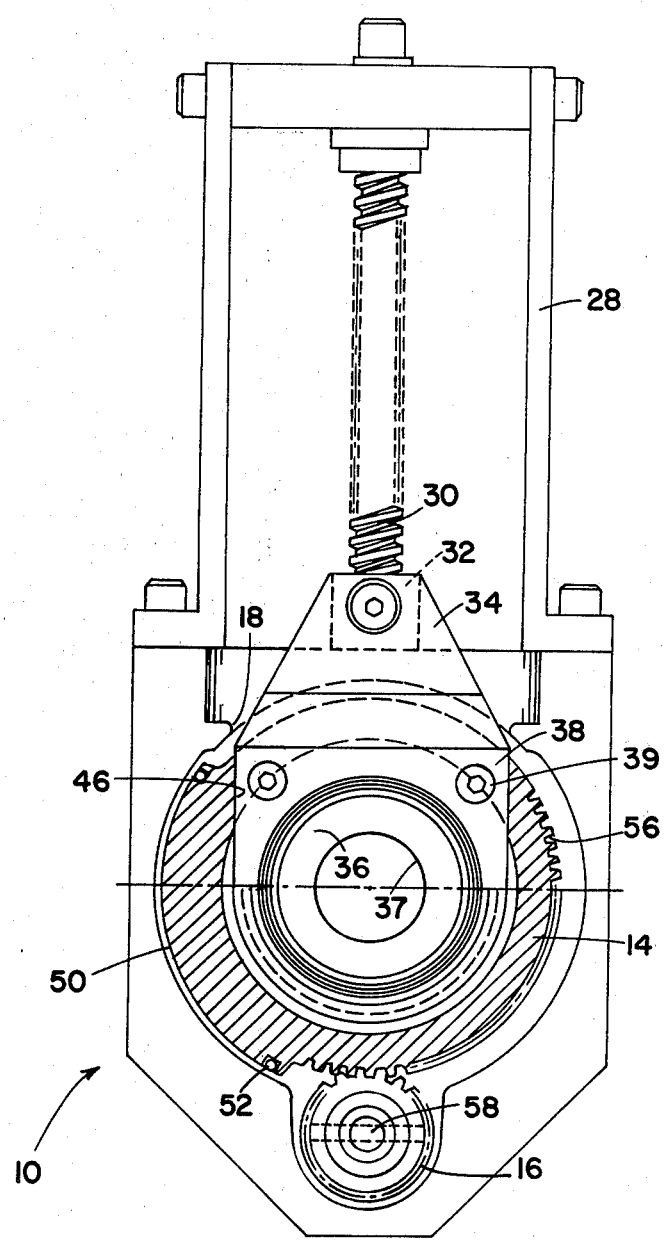
FIG. 3 is another vertical section showing another position of the orifice disc carrier.

Referring to particularly to FIGS. 2 and 3, the rotatable annular or member 14 which is carried between the end blocks 12a and 12b is formed in three integral segments. The first segment 46 comprises a receptacle which, when aligned with the access opening 18 formed in the central housing section is adapted to receive the orifice disc carrier 34 with the opening 37 of the orifice disc 36 concentric with the flow tubes 20. This defines the active position of the rotating member 14 and the orifice carrier 34, with the pressure drop being determined by pressure measurements taken at taps 48 and 49 in the upstream and downstream end blocks 12a and 12b. The second segment 50 of the annular member is a sealing member and includes a resilient seal 52 which engages around the inside sealing surface 54 of the access opening 18 when the annular member is moved with the sealing surface 50 in alignment therewith. This, of course, could only be done when the orifice disc carrier 34 is in its raised position shown in FIG. 2 and serves to seal off the flow tubes 20 from the outside of the housing 12 so that the orifice disc 36 may be serviced or replaced while flow continues through the flow tubes 20.

The third segment 56 of the annular member 14 is a gear segment which, in turn, is engaged by the pinion 16. The pinion shaft 58 extends outside of the housing 12 wherein an end 60 thereof may be engaged to rotate the pinion 16 and turn the annular member 14 to its sealing position shown in FIG. 2 or to its active position shown in FIG. 3.

While this invention has been described in conjunction with a preferred embodiment thereof, it obvious that modifications and changes therein may be made by those skilled in the art to which it pertains, without departing from the spirit and scope of this invention as defined by the claims appended hereto.

What is claimed as invention is:

1. An orifice meter comprising:
   a body with a flow passageway therethrough;
   means forming a rotary bearing surface in said body transverse to said passageway;
   an annular member rotatable in said bearing surface;
   an access opening from said bearing surface to the exterior of said body;
   a complementary receptacle opening in one segment of said annular member;
   sealing means in another segment of said annular member which, when aligned with said access opening, prevents leakage therethrough from said flow passage;
   a gate-like orifice disc carrier;
   means on said body operable to move said carrier between an active position extending through said receptacle opening in alignment with said flow passage and a servicing position outside of said body; and
   means for rotating said annular member between active and servicing positions with, respectively, said receptacle opening and said sealing means in alignment with said access opening.

2. The orifice meter defined by claim 1 wherein said rotating means comprises:
   a gear segment on said annular member;
   a pinion rotatable in said body and engaging said gear segment; and
   means for rotating said pinion.

3. The orifice meter defined by claim 1 wherein said sealing means comprises:
   an arcuate surface on the periphery of said annular member;
   a continuous seal ring recess around the periphery of said surface; and
   a resilient seal received in said recess.

4. The orifice meter defined by claim 1 wherein said carrier moving means comprises a screw rotatable on said body on the exterior thereof; and
   a drive nut on said orifice disc carrier engaged on said screw; and
   means exterior of said body for rotating said screw.

* * * * *